United States Patent
Korenblit et al.

(10) Patent No.: US 8,593,724 B1
(45) Date of Patent: Nov. 26, 2013

(54) FOUR LEVEL MAGNON LASER AT ROOM TEMPERATURES

(75) Inventors: Yehiel Korenblit, Netanya (IL); Boris G. Tankhilevich, Walnut Creek, CA (US)

(73) Assignee: Terahertz Technologies LLC, Walnut Creek, CA (US)

( * ) Notice: Subject to any disclaimer, the term of this patent is extended or adjusted under 35 U.S.C. 154(b) by 447 days.

(21) Appl. No.: 13/043,470

(22) Filed: Mar. 9, 2011

Related U.S. Application Data

(60) Division of application No. 12/290,527, filed on Nov. 1, 2008, now Pat. No. 8,031,397, which is a continuation-in-part of application No. 11/701,284, filed on Jan. 31, 2007, now Pat. No. 7,508,578, which is a continuation-in-part of application No. 11/481,197, filed on Jul. 3, 2006, now Pat. No. 7,430,074.

(51) Int. Cl.
*H01S 4/00* (2006.01)
*H01S 3/00* (2006.01)

(52) U.S. Cl.
USPC .............................. 359/342; 372/37; 372/43.01

(58) Field of Classification Search
USPC ................... 359/342; 372/37, 43.01
See application file for complete search history.

(56) References Cited

U.S. PATENT DOCUMENTS

| | | | |
|---|---|---|---|
| 3,822,410 A | 7/1974 | Madey | |
| 3,986,194 A | 10/1976 | Masumoto | |
| 4,626,800 A | 12/1986 | Murakami | |
| 4,679,023 A | 7/1987 | Nelson | |
| 4,914,665 A | 4/1990 | Sorin | |
| 6,111,416 A | 8/2000 | Zhang | |
| 6,230,038 B1 | 5/2001 | von Gutfeld | |
| 6,365,286 B1 | 4/2002 | Inomata | |
| 6,614,827 B1 | 9/2003 | Mooradian | |
| 6,912,148 B2 | 6/2005 | Hannah | |
| 6,988,058 B1 | 1/2006 | Sherwin | |
| 2001/0031547 A1 | 10/2001 | Ohno | |
| 2002/0058120 A1 | 5/2002 | Uchida | |
| 2003/0021908 A1 | 1/2003 | Nickel | |
| 2004/0094801 A1 | 5/2004 | Liang | |
| 2005/0242287 A1 | 11/2005 | Hakimi | |
| 2006/0060815 A1 | 3/2006 | Punnoose | |
| 2006/0088324 A1 | 4/2006 | Fujimoto | |
| 2006/0108619 A1 | 5/2006 | Yoshida | |
| 2006/0238191 A1 | 10/2006 | Saito | |
| 2006/0292704 A1 | 12/2006 | Bailleul et al. | |

OTHER PUBLICATIONS

JP Appl. No. Tokugan-2009-548242 Office Action dated Jan. 21, 2013.*
U.S. Appl. No. 12/661,153: Notice of Allowance dated Mar. 17, 2011.
U.S. Appl. No. 12/315,424: Notice of Allowance dated Mar. 21, 2011.

(Continued)

*Primary Examiner* — Eric Bolda
(74) *Attorney, Agent, or Firm* — Boris G. Tankhilevich

(57) ABSTRACT

A four level magnon laser comprising: a Magnon Gain Medium, wherein the Magnon Gain Medium supports generation of nonequilibrium magnons, and a means for pumping nonequilibrium electrons into Magnon Gain Medium. Propagation of nonequilibrium electrons in Magnon Gain Medium causes generation of nonequilibrium magnons. Magnon Gain Medium comprises ferromagnetic materials at room temperatures including the half-metallic ferromagnets.

14 Claims, 2 Drawing Sheets

(56) References Cited

OTHER PUBLICATIONS

JP Appl. No. Tokugan-2009-548242, Office Action mailing date Jan. 21, 2013.
Tankhilevich et al. "Novel spintronic device: terahertz magnon-photon laser", Journal of Physics: Conf. Ser. 263 012004, 1st International Symposium on Spintronic Devices and Commercialization (ISSDC2010), IOP Publishing, Feb. 2011.
Tankhilevich et al. "Terahertz Imaging and spectroscopy: Advances in Power and Tunability", Proceedings of the 2010 World Molecular Imaging Congress, vol. 12, Suppl 2, pp. S1340, Dec. 2010.
M. Tsoi; A. G. M Jansen; J. Bass; W.-C. Chiang; V. TSOI; P. Wyder, "Generation and Detection of Phase-Coherent Current-Driven Magnons in Magnetic Multilayers", Letters to Nature, Nature, Jul. 6, 2000, p. 46-48, vol. 406, Macmillan Magazines Ltd.
M. Belhadi; A. Khater, "Spin Wave Modes and Magnon Scattering At Surface Nanostructure on 2D Heisenberg Ferromagnets", Surface Review and Letters, 2004, p. 99-109, vol. 11, No.
R. Srivastava, "Optically Detected Terahertz Resonance Spectroscopy of Semiconductor Nanostructures", Thesis, Rice University, Apr. 2005, Houston Texas.
I. E. Radu, "Ultrafast Electron, Lattice and Spin Dynamics on Rare-Earth Metal Surfaces", Thesis, Freie Universitat Berlin, Mar. 2006, Berlin Germany.
M. J. Lisowski, "Electron and Magnetisation Dynamics in Metals Studied by Time-Resolved Photoemission", Dissertation Abstract, Freie Universitat Berlin, Jan. 2006, Berlin Germany.

U.S. Appl. No. 11/481,197: Office Action—Election/Restrictions dated Jun. 5, 2007.
U.S. Appl. No. 11/481,197: Office Action dated Aug. 31, 2007.
U.S. Appl. No. 11/481,197: Notice of Allowance and Fee(s) Due dated Feb. 22, 2008.
U.S. Appl. No. 11/496,889: Notice of Allowance and Fee(s) Due dated Jun. 30, 2008.
U.S. Appl. No. 11/701,284: Office Action dated Mar. 6, 2008.
U.S. Appl. No. 11/701,284: Notice of Allowance and Fee(s) Due dated Oct. 6, 2008.
U.S. Appl. No. 11/799,937: Notice of Allowance and Fee(s) Due dated Oct. 9, 2008.
U.S. Appl. No. 12/290,527: Office Action—Election/Restrictions dated Oct. 1, 2010.
U.S. Appl. No. 12/290,527: Office Action dated Dec. 3, 2010.
Korenblit et al. "High Frequency Magnon Generation by NonEquilibrium Electrons and the Instability of the Magnon System", Physics Letters, vol. 64A, No. 3, pp. 307-330, Dec. 1977.
U.S. Appl. No. 12/290,527: Notice of Allowance and Fee(s) Due dated Jun. 27, 2011.
Tankhilevich et al. "Magnon Laser", 6th International Workshop on Multifunctional Materials, Jul. 31-Aug. 3, 1920, Kodiak, Alaska, pp. 33.
Tankhilevich et al. "The Terahertz Magnon Photon Laser Imaging System (TERMAPLIS)", NCI Conference: Cancer Detection and Diagnostic Technologies for Global Health, Aug. 22-23, 2011, Rockville, Maryland, p. 87 (TTT-55).

* cited by examiner

FOUR LEVEL MAGNON LASER AT ROOM TEMPERATURES

This is the divisional of the U.S. patent application Ser. No. 12/290,527, filed on Nov. 1, 2008 now U.S. Pat. No. 8,031, 397, and entitled "MAGNON LASER AT ROOM TEMPERATURES", which is the continuation-in-part of the U.S. patent application Ser. No. 11/701,284, filed Jan. 31, 2007, now U.S. Pat. No. 7,508,578 "MAGNON LASER", which is a continuation-in-part of U.S. patent application Ser. No. 11/481,197, filed Jul. 3, 2006, now the parent U.S. Pat. No. 7,430,074 "GENERATION OF TERAHERTZ WAVES".

TECHNICAL FIELD

The technology relates to magnon laser effect.

BACKGROUND

In the parent U.S. Pat. No. 7,430,074 "GENERATION OF TERAHERTZ WAVES" the generation of nonequilibrium magnons was disclosed. In the U.S. patent application Ser. No. 11/701,284, filed on Jan. 31, 2007 and entitled "MAGNON LASER", the generation of nonequilibrium magnons was described by using a general laser analogy.

In the present patent application a magnon laser that utilizes a magnon gain medium (MGM) at room temperatures is disclosed.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A method of generation of nonequilibrium magnons by using a four level magnon laser is provided. The magnon laser utilizes a magnon gain medium (MGM) selected from the group consisting of: {a ferromagnetic semiconductor; a dilute magnetic semiconductor (DMS); a half-metallic ferromagnet (HMF); and a ferromagnetic conductor, with a gap in the density of states of the minority electrons around the Fermi energy}. The half-metallic ferromagnet (HMF) is selected from the group consisting of: {a spin-polarized Heusler alloy; a spin-polarized Colossal magnetoresistance material; $CrO_2$; $Sr_2FeMoO_6$; and $Fe_3O_4$}.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Figure 1:
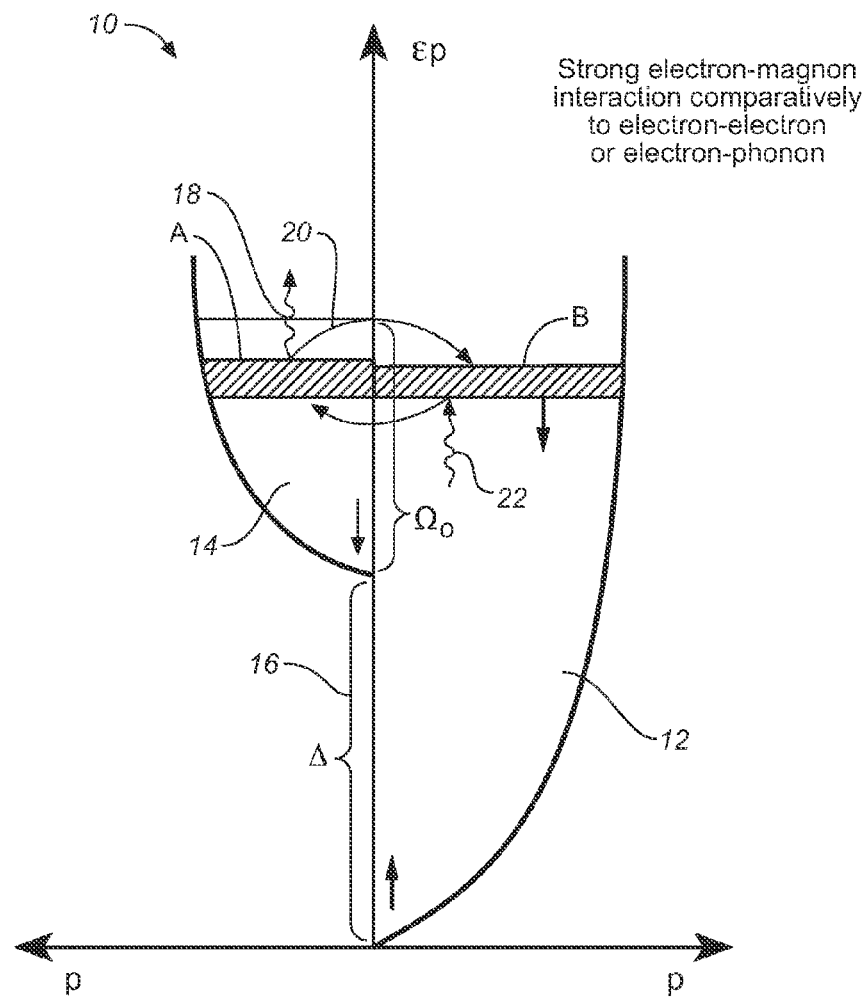
FIG. 1 illustrates process of strong electron-magnon interaction (comparatively with electron-electron or with electron-phonon interaction) wherein a nonequilibrium electron put in the upper subband with spin down rapidly emits a magnon with a large wave vector in accordance with an embodiment of the present technology.

Reference now be made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

Recently some dilute magnetic semiconductors (DMS), with Tc above room temperature, have been studied intensively. These are oxides doped with magnetic cations. The examples are: GaN, doping Mn—9%, Tc=940 K; AlN, doping Cr—7%, Tc>600 K; $TiO_2$ (anatase), doping Co—7%, Tc=650 K; $SnO_2$, doping Co—5%, Tc=650 K. These magnets can be used as a magnon gain medium (MGM) to generate nonequilibrium magnons and photons at room temperatures.

Another system that can be used as a magnon gain medium (MGM) is a system comprising a half-metallic ferromagnet (HMF). Half-metallic ferromagnets (HMF) are ferromagnetic conductors, with a gap in the density of states of the minority electrons around the Fermi energy, $E_f$. Thus, the electrons in these materials are supposed to be 100% spin polarized at $E_f$. Thermal effects and spin-orbital interactions reduce the electron polarization. However, the electron polarization is close to 100% in half-metallic ferromagnets with spin-orbital interaction smaller than the minority electron gap, and at temperatures much lower than the Curie temperature Tc.

Half-metallic ferromagnets (HMF) form a quite diverse collection of materials with very different chemical and physical properties.

Chromium dioxide, $CrO_2$. Tc=390 K. Magnetic moment per Cr=2μB. The polarization measured at low temperatures is close to 100%. There are some other known half-metallic ferromagnetic oxides, e.g. $Sr_2FeMoO_6$.

Heusler alloys. Most of the predicted HMF are Heusler alloys. In general, these are ternary $X_2YZ$-compounds, X and Y are usually transition metals and Z is a main group element. The most studied of them is NiMnSb: Tc=728K, magnetic moment close to 4μB. Experiments show that NiMnSb is a half-metallic ferromagnet at low temperatures. But there is evidence that at T≈90K a phase transition into a usual ferromagnetic state takes place, and it seems unlikely that NiMnSb is a half-metallic ferromagnet near room temperature.

There are many other Heusler alloys with half-metallic ferromagnet properties, like: (1) $Co_2MnSi$ having Tc of 1034K and magnetic moment of 5μB; (2) $Co_2MnGe$ having Tc of 905K and magnetic moment close to 5μB; and (3) $Co_2MnSn$ having Tc of 826K and magnetic moment of 5.4μB; etc.

It has been shown recently (S. Wurmehl et al., PRB 72, 184434 (2005)), that the alloy with the highest magnetic moment and Tc is $Co_2FeSi$ having Tc of 1100 K (higher than for Fe), and having magnetic moment per unit cell of 6μB. The orbital contribution to the moments is small, while the exchange gap is large, of order 2 eV. Therefore, the effect of thermal fluctuations and spin-orbit interaction on the electron polarization is negligible. One should expect, therefore, that the electrons in $Co_2FeSi$ are polarized at high temperatures, sufficiently close to Tc. Indeed, according to the experiment the magnetic moment at 300 K is the same as at 5K.

Colossal magnetoresistance materials: $La_{1-x}Sr_xMnO_3$ (for intermediate values of x) is presumably a half-metallic ferromagnet having Tc close to room temperature. Photoelectron emission experiments confirm the half-metallicity of $La_{0.7}Sr_{0.3}MnO_3$, with Tc=350 K. The polarization degree at T=40K is 100±5%, the gap for the minority spins is 1.2 eV.

Note that HMF, as well as ferromagnetic semiconductors, differ from "normal" metallic ferromagnets by the absence of one-magnon scattering processes. Therefore, spin waves in HMF, as well as in magnetic insulators, are well defined in the entire Brillouin zone. This was confirmed by neutron scattering experiments performed on some Heusler alloys. For references, please see: (1) Y. Noda and Y. Ishikawa (*J. Phys. Soc. Japan* v. 40, 690, 699 (1976)) have investigated the following Heusler alloys: $Pd_2MnSn$ and $Ni_2MnSn$. (2) K. Tajima et al. (*J. Phys. Soc. Jap.* v.43, 483 (1977)), have investigated Heusler alloy $Cu_2MnAl$.

Hence, the magnon laser effect (disclosed in the parent U.S. Pat. No. 7,430,074 "GENERATION OF TERAHERTZ WAVES") can be observed (in at least some of the referenced above half-metals) at room temperatures.

However, in half-metals the spin-up electron with energy larger than the exchange gap will interact with the spin-up electrons with energy smaller than the gap. Since the number of the spin-up electrons is large (as compared to the number of spin-up electrons in ferromagnetic semiconductors) this interaction should lead to the fast thermalisation of high-energy electrons, which will prevent the reverse process of absorption of magnons by electrons with spin-up, which is crucial for existence of the magnon laser.

In other words, the electron bath in half-metallic ferromagnets could play the same role as the optical phonons in ferromagnetic semiconductors. However, in half-metallic ferromagnetic oxides the interaction of the electrons with spin-up with optical phonons could also play an important role.

The following disclosure is focused on magnon laser at room temperatures that can be observed in half-metallic ferromagnets, in which only the states in the lower subband are occupied in equilibrium, i.e. the electrons are fully polarized, as shown in FIG. 1.

A nonequilibrium electron 20 put in the upper subband with spin down rapidly emits a magnon 18, with a large wave vector $q \approx \hbar^{-1}(2m\Delta)^{1/2}$, where m is the electron effective mass. It follows from the energy and momentum conservation laws that if the energy of this electron, $\epsilon_p$, measured from the bottom of the spin down subband is much smaller than $\Delta$, the wave vector of the emitted magnon, q lies in the interval $q_1 \leq q \leq q_2$, where $q_{1,2} = \hbar^{-1}(p_0 \pm p)$, $p_0 = (2m\Delta)^{1/2}$, $p = (2m\epsilon_p)^{1/2} \ll p_0$. The frequency of these magnons may be in the Terahertz region.

The ratio of the magnon generation rate, $\Gamma_e(\vec{q})$, to the rate of $\Gamma_m(\vec{q})$, their relaxation (in collisions with equilibrium magnons) is a function of the wave vector $\vec{q}$. Therefore the nonequilibrium magnon distribution function, $N(\vec{q})$ has a maximum at some wave vector $\vec{q} = \vec{q}^*$. $N(\vec{q})$ increases with the increase of the electron pumping, and because of the simulated emission of magnons, the function $N(\vec{q})$ grows most rapidly at $\vec{q}$ close to $\vec{q}^*$.

When the pump reaches some critical value, $N(\vec{q}^*)$ starts to increase very fast with the increase of the electron pumping. At some conditions the generation of magnons with $\vec{q} = \vec{q}^*$ becomes avalanche-like, and the magnon system becomes unstable. For more details, please see U.S. Pat. No. 7,430,074 "GENERATION OF TERAHERTZ WAVES", and equations below.

Basic Equations for Magnon Generation.

The system of equations which govern the behavior of the electron, $f_\downarrow(\vec{p})$, and magnon, $N(\vec{q})$ distribution functions were obtained in the following paper: I. Ya. Korenblit and B. G. Tankhilevich, Soy. Phys. -JETP, 46, 1167 (1977). They read $$[1 + N(\vec{q})][\Gamma_e(\vec{q})] - [N(\vec{q}) - N^{(0)}(\vec{q})][\Gamma_m(\vec{q})] = 0 \qquad \text{(Eqs. 1)}$$

$$f_\downarrow(\vec{p})\gamma_{em}(\vec{p}) = g(\varepsilon_p).$$

Here $\Gamma_e(\vec{q})$ is the rate of relaxation of magnons in collisions with electrons $$\Gamma_e(\vec{q}) = 4\pi\hbar^{-1}I^2Sv_0\int d^3p(2\pi\hbar)^{-3}\delta(\gamma_\uparrow(\vec{p}-\hbar\vec{q})|\epsilon_{\vec{p}\downarrow} - \hbar\omega_{\vec{q}} - \epsilon_{\vec{p}} - \hbar\vec{q}_{,\uparrow})f_\downarrow(\vec{p}), \qquad \text{(Eq. 2)}$$

where $v_0$ is the unit cell volume.

$\gamma_{em}$ is the electron-magnon relaxation rate:

$$\gamma_{em}(\vec{p}) = 4\pi\hbar^{-1}I^2Sv_0\int d^3q(2\pi\hbar)^{-3}\delta(\gamma_\uparrow(\vec{p}-\hbar\vec{q})|\epsilon_{\vec{p}\downarrow} - \hbar\omega_{\vec{q}} - \epsilon_{\vec{p}} - \hbar\vec{q}_{,\uparrow})(1+N(\vec{q})), \qquad \text{(Eq. 3)}$$

The smeared δ-function, $\delta(\gamma|\epsilon)$, takes into account the finite lifetime of the electrons in the final state, caused by the interaction with electrons with spin-up (or by the interaction with optical phonons). In the case of electron thermalisation due to interaction with optical phonons $$\delta(\gamma | \varepsilon) = \frac{1}{\pi} \frac{\hbar\gamma}{(\varepsilon^2 + \hbar^2\gamma^2)} \qquad \text{(Eq. 4)}$$

The rate $\gamma_\uparrow(p, \epsilon_p)$ is the known electron damping rate due to the emission of longitudinal optical phonons (22 of FIG. 1). For electrons with energy $\epsilon_p$ close to $\Delta$, this rate is given by $$\gamma_\uparrow(\epsilon_p) = (\pi/2)\alpha\Omega(\Omega/\Delta)^{1/2}\ln(4\Delta/\Omega) \ll \Delta. \qquad \text{(Eq. 5)}$$

Here $\Omega$ is the energy of an optical phonon, and $\alpha$ is the strength of the electron-phonon interaction.

The function $g(\epsilon)$ is the generation function of electrons, with spin down. We shall treat it as a δ-function $$g(\epsilon_p) = g_0\epsilon\delta(\epsilon - \epsilon_p). \qquad \text{(Eq. 6)}$$

We suppose in what follows that the energy $\epsilon$ is small, $\epsilon \ll \Delta$.

The second term in the l.h.s. in the first of Eqs. (1) describes the relaxation of nonequilibrium magnons in collisions with equilibrium ones, under the assumption that $N(\vec{q})$, is close to its equilibrium value, $$N^{(0)}(\vec{q}) = [e^{\hbar\omega_q/kT} - 1]^{-1}. \qquad \text{(Eq. 7)}$$

$\Gamma_m(\vec{q})$ is the magnon-magnon relaxation rate. From Eqs. (1) we obtain the following integral equation for $N(\vec{q})$, $$N(\vec{q}) = (N^0(\vec{q}) + \Gamma_e(\vec{q})/\Gamma_m(\vec{q}))(1 - \Gamma_e(\vec{q})/\Gamma_m(\vec{q}))^{-1}, \qquad \text{(Eq. 8)}$$

where $$\Gamma_e(\vec{q}) = g_0\epsilon\int d^3p\delta(\gamma_\uparrow(\vec{p}-\hbar\vec{q})|\epsilon_{\vec{p}\downarrow} - \hbar\omega_{\vec{q}} - \epsilon_{\vec{p}} - \hbar\vec{q}_{,\uparrow})\delta(\epsilon - \epsilon_p)Z^{-1}(\vec{p}), \qquad \text{(Eq. 9)}$$

and $$Z(\vec{p}) = \int d^3 q \delta(\gamma_1(\vec{p} - \hbar \vec{q}) | \epsilon_{\vec{p}\perp} - \hbar \omega_{\vec{q}} - \epsilon_{\vec{p}_-} \hbar_{\vec{q},\parallel})(1 + N(\vec{q})).$$ (Eq. 10)

Eq. (8) is formally reminiscent of the expression for the magnon distribution function under conditions of parametric pumping. The difference is that here the rate $\Gamma_e$ is itself a functional of $N(\vec{q})$, since the number of the emitted magnons depends on the distribution function of the electrons with spin down, $f_\downarrow$, which according to Eqs. (2) and (3) is in its turn determined not only by the pump $g(\epsilon_p)$ but also by a certain average (10) over the magnon distribution function. The behavior of $N(\vec{q})$ is therefore different from that in the case of parametric pumping.

$N(\vec{q})$ For Strong Pumping. Isotropic case.

Let us assume for simplicity that the magnon and electron spectra are isotropic. Then $\Gamma_e(q)$ and $\Gamma_m(q)$ do not depend on the direction of $\vec{q}$. The relaxation rate $\Gamma(q)$ is usually a power function of q, and it can be written as $$\Gamma_m(q) = \Gamma_m(p_0)(\hbar q/p_0)^t.$$ (Eq. 11)

More specifically, if $\Gamma_m(q)$ is determined by magnon-magnon exchange scattering, then t=4 for magnons, with energy $\hbar \omega(q_0)$ larger than kT, and t=3 for magnons, with energy $\hbar \omega(q_0)$ smaller than kT.

The strong pumping regime sets in, when $g_0$ exceeds a critical value $G_c$. If the damping of electrons is due to interaction with optical phonons (and is less than $(\epsilon \Delta)^{1/2}$), this critical value is given by $$G_c = 2gc/(t+1),$$

$$g_c = (\Delta/\epsilon)^{3/2} \Gamma_m(q_0)[1 + N^{(0)}(q_0)].$$ (Eqs. 12)

At $g_0 > G_c$ the function N(q) increases exponentially with pumping $$N(q) = [1 + N^{(0)}(q_0)](p_0/2p_\epsilon(t+1))\exp(g_0/G_c),$$ (Eq. 13)

if q falls into the smooth region $$p_0 - p_\epsilon \leq \hbar q \leq p_0 - p_\epsilon + \delta \hbar q,$$

$$\delta \hbar q = 2p_\epsilon \exp(-g_0/G_c),$$ (Eqs. 14)

while N(q) with wave vectors outside of the above-given range does not depend on the pump. Thus, under sufficiently strong pumping the magnon distribution function has a sharp peak at $\hbar q \approx p_0 - p_\epsilon$.

Let us define the number of electrons, $\beta$, pumped per second per unit cell as:

$$\beta = v_0(2\pi \hbar)^{-3} \int d^3 p g(\epsilon_p).$$ (Eq. 15)

One gets for the pumping given by Eq. (6)

$$\beta = (v_0 \epsilon^{3/2} m^{3/2} g_0/2^{1/2} \pi^2 \hbar^3)$$ (Eq. 16)

and the critical pumping $\beta_c$, with $g_0 = G_c$ is $$\beta_c = (v_0 q^3_0/(2(t+1)\pi^2))\Gamma_m(q_0)[1 + N^{(0)}(q_0)].$$ (Eq. 17)

Since we are interested in high-frequency magnons, we suppose that their relaxation is mainly due to four-magnon exchange interaction. Using the expressions for $\Gamma_m$ given in the following reference (V. G. Vaks, A. I. Larkin and S. A. Pikin, JETP 53 (1967)), we estimated for T/Tc≈0.2, and $\hbar \omega(q_0) > kT$, $N^{(0)}(q_0) \ll 1$: $\Gamma_m \approx (10^8 - 10^9)$ sec$^{-1}$.

Thus, it follows from Eq. (17) the estimate $\beta_c \approx (10^5 - 10^7)$ sec$^{-1}$, and we took into account that $N^{(0)}(q_0)$ is small.

The physical meaning of the critical pumping $G_c$ can be understood as follows. The ratio $\Gamma_e/\Gamma_m$ of the rate of generation of the magnons to the rate of their relaxation reaches its maximum value at $\hbar q = p_0 - p_\epsilon$ and has its minimum at $\hbar q = p_0 + p_\epsilon$, i.e. there is an excess generation on the left end of the interval in comparison with the right end. Stimulated emission causes the increase of this asymmetry. Nonlinear generation begins when the difference between the number of nonequilibrium magnons at the ends of the generation interval becomes equal to the number of equilibrium magnons, if $N^{(0)} > 1$. On the other hand, nonlinear generation begins when the difference between the number of nonequilibrium magnons at the ends of the generation interval becomes equal to 1, if the opposite inequality ($N^{(0)} < 1$) holds.

Figure 2:
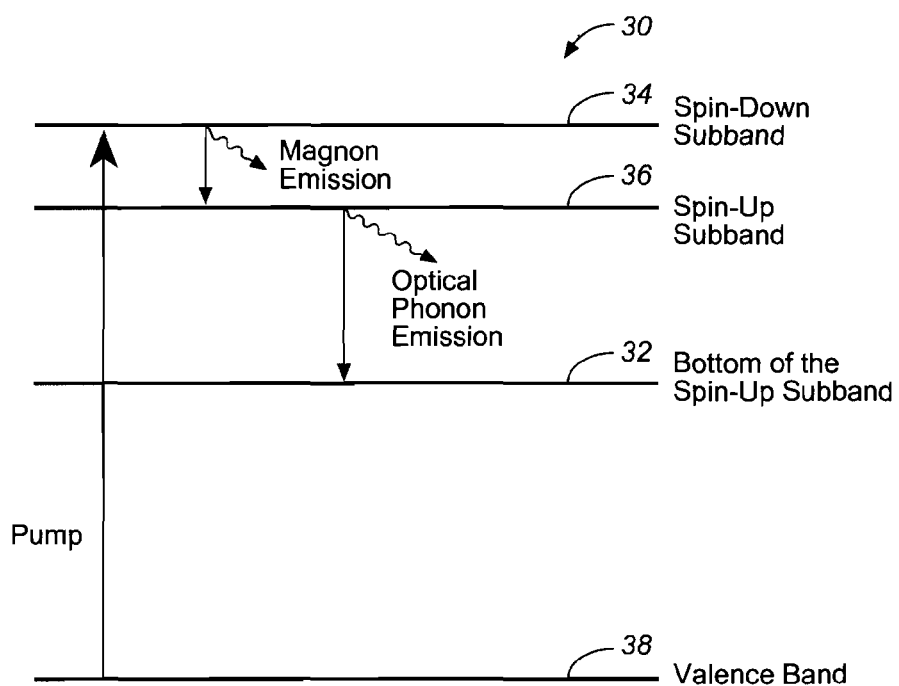
FIG. 2 shows the energy level structure of a four-level magnon laser operating at room temperatures in accordance with an embodiment of the present technology.

In an embodiment, FIG. 2 shows a diagram 30 that illustrates a four-level magnon laser of the present technology. In this embodiment of the present technology, the four-level magnon laser 30 further comprises a four-level energy structure further comprising: a lowest energy level 38 corresponding to a valence band, a highest energy level 34 corresponding to a spin-down subband, a first intermediate level 36 corresponding to the lower energy electron states in the spin-up subband, and a second intermediate energy level 32 corresponding to a spin-up subband.

The electrons pumped from the lowest energy level 38 into the highest energy level 34 move into the lower energy electron states (the first intermediate level 36) in the spin-up subband, wherein each pumped electron emits a magnon. The electrons in the spin-up subband move from the first intermediate state 36 into the bottom of the spin-up subband (the second intermediate energy level 32) by interacting with electrons with spin-up (or by emitting optical phonons). The electrons are pumped from the lowest energy level 38 into the highest energy level 34 by using a pumping means (not shown).

In an embodiment of the present technology, a conventional laser can be used as a pumping means to pump electrons form the lowest energy level (valence band) 38 into the highest energy level 34 (spin-down subband).

In an embodiment of the present technology, the four-level magnon laser (30 of FIG. 2) further comprises: a thermostat (not shown), wherein the ferromagnetic material is placed in the thermostat, and wherein the thermostat is configured to maintain temperature of the ferromagnetic material below a critical temperature.

In an embodiment, the four-level magnon laser of the present technology (30 of FIG. 2) can be used for generation of nonequilibrium magnons by performing the following steps (not shown): (A) providing the four-level magnon laser; and (B) pumping electrons into the four-level magnon laser from the lowest energy level into the highest energy level by using a pumping means.

Pumping Methods.

To implement the GS magnon laser of the present technology, one could use a conventional laser pumping means, as well as an electron injection means. To implement the four-level magnon laser of the present technology (30 of FIG. 2), one could use a conventional laser pumping means.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A four-level magnon laser comprising:
   a ferromagnetic material having a conduction band that is split into two sub bands, a first said subband having spin up (along the direction of magnetization of said ferromagnetic material), and a second said subband having spin down (opposite to the direction of magnetization of said ferromagnetic material), and said ferromagnetic material further comprising:
a four-level laser structure further comprising:
a lowest energy level corresponding to a valence band;
a highest energy level corresponding to a spin-down subband;
a second intermediate energy level corresponding to a spin-up subband; wherein electrons from said lowest energy level pumped into said highest energy level move into the lower energy electron states in said spin-up subband, and wherein said pumped electrons emit magnons;
and
a first intermediate level corresponding to said lower energy electron states in said spin-up subband; and wherein said second intermediate energy level is placed in said energy space lower than said first intermediate level;
and wherein said electrons in said spin-up subband move into the bottom of said spin-up subband by using an energy relaxation mechanism selected form the group consisting of: {emission of optical phonons; and electron-electron interaction};
and wherein said electrons are pumped from said lowest energy level into said highest energy level by using a pumping means.

2. The four-level magnon laser of claim 1 further comprising:
said pumping means configured to pump said electrons from said lowest energy level into said highest energy level.

3. The four-level magnon laser of claim 2, wherein said pumping means further comprises:
a conventional laser means configured to pump said electrons from said lowest energy level into said highest energy level.

4. The four-level magnon laser of claim 1, wherein said ferromagnetic material is selected from the group consisting of:
a ferromagnetic semiconductor; a dilute magnetic semiconductor (DMS); a half-metallic ferromagnet(HMF); and a ferromagnetic conductor, with a gap in the density of states of the minority electrons around the Fermi energy.

5. The four-level magnon laser of claim 4, wherein said half-metallic ferromagnet (HMF) is selected from the group consisting of:
a spin-polarized Heusler alloy; a spin-polarized Colossal magnetoresistance material; $CrO_2$; $Sr_2FeMoO_6$; and $Fe_3O_4$.

6. The four-level magnon laser of claim 5, wherein said spin-polarized Heusler alloy is selected from the group consisting of:
NiMnSb; $Co_2MnSi$; $Co_2MnGe$; $Co_2MnSn$; and $Co_2FeS$.

7. The four-level magnon laser of claim 1 further comprising:
a thermostat, wherein said ferromagnetic material is placed in said thermostat, and wherein said thermostat is configured to maintain temperature of said ferromagnetic material below a critical temperature.

8. A method for generation of nonequilibrium magnons by using a four-level magnon laser, said method comprising:
(A) providing said four-level magnon laser;
and
(B) pumping electrons into said four-level magnon laser;

wherein said four-level magnon laser further comprises: a ferromagnetic material having a conduction band that is split into two sub bands, a first said subband having spin up (along the direction of magnetization of said ferromagnetic material), a second said subband having spin down (opposite to the direction of magnetization of said ferromagnetic material), said ferromagnetic material further comprising: a four-level laser structure further comprising: a lowest energy level corresponding to a valence band; a highest energy level corresponding to a spin-down subband; a second intermediate energy level corresponding to a spin-up subband; wherein electrons from said lowest energy level pumped into said highest energy level move into the lower energy electron states in said spin-up subband, and wherein said pumped electrons emit magnons; and a first intermediate level corresponding to said lower energy electron states in said spin-up subband; and wherein said electrons in said spin-up subband move into the bottom of said spin-up subband by using an energy relaxation mechanism selected form the group consisting of: {emission of optical phonons; and electron-electron interaction};
and wherein said second intermediate energy level is placed in said energy space lower than said first intermediate level; and wherein said electrons are pumped from said lowest energy level into said highest energy level by using a pumping means.

9. The method of claim 8 further comprising:
(C) placing said four-level magnon laser into a thermostat; wherein said thermostat is configured to maintain temperature of said ferromagnetic material below a critical temperature.

10. The method of claim 8, wherein said step (A) further comprises:
(A1) selecting said ferromagnetic material from the group consisting of:
a ferromagnetic semiconductor; a dilute magnetic semiconductor (DMS); a half-metallic ferromagnet(HMF); and a ferromagnetic conductor, with a gap in the density of states of the minority electrons around the Fermi energy.

11. The method of claim 10, wherein said step (A1) further comprises:
(A1, 1) selecting said half-metallic ferromagnet (HMF) from the group consisting of:
a spin-polarized Heusler alloy; a spin-polarized Colossal magnetoresistance material; $CrO_2$; $Sr_2FeMoO_6$; and $Fe_3O_4$.

12. The method of claim 11, wherein said step (A1, 1) further comprises:
(A1, 1, 1) selecting said spin-polarized Heusler alloy from the group consisting of:
NiMnSb; $Co_2MnSi$; $Co_2MnGe$; $Co_2MnSn$; and $Co_2FeS$.

13. The method of claim 1, wherein said step (B) further comprises:
(B1) configuring said pumping means to pump said electrons from said lowest energy level into said highest energy level.

14. The method of claim 13, wherein said step (B1) further comprises:
(B1, 1) configuring a conventional laser means to pump said electrons from said lowest energy level into said highest energy level.

* * * * *